US008355494B2

(12) United States Patent
Leister et al.

(10) Patent No.: US 8,355,494 B2
(45) Date of Patent: Jan. 15, 2013

(54) SYSTEM AND METHOD FOR HANDLING TOLL FREE NUMBER TELEPHONE CALLS

(75) Inventors: Jeffrey Leister, Lenexa, KS (US); John Zeigler, Lee Summit, MO (US); Jennifer Stilgenbauer, Lawrence, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1022 days.

(21) Appl. No.: 12/363,462

(22) Filed: Jan. 30, 2009

(65) Prior Publication Data

US 2010/0195813 A1 Aug. 5, 2010

(51) Int. Cl.
*H04M 7/00* (2006.01)
*H04M 15/00* (2006.01)

(52) U.S. Cl. ............... 379/220.01; 379/114.24; 379/219; 379/221.02; 379/222; 379/223

(58) Field of Classification Search ............. 379/220.01, 379/114.24, 219, 111, 221.1, 221.09, 222, 379/223, 221.02
See application file for complete search history.

(56) References Cited

U.S. PATENT DOCUMENTS

2010/0014651 A1* 1/2010 Bajpay et al. ............ 379/114.24

* cited by examiner

*Primary Examiner* — Thjuan K Addy
(74) *Attorney, Agent, or Firm* — Swanson & Bratschun, L.L.C.

(57) ABSTRACT

A system and method for processing toll free telephone calls by a telecommunications service provider may include receiving, by the telecommunications service provider, a telephone call request for a telephone call being placed to a toll free telephone number from a telephone within a service area of the telecommunications service provider. The telecommunications service provider may determine that the toll free telephone number is one operated by the telecommunications service provider. The telephone call may be routed via a network of the telecommunications service provider to a telephone associated with the toll free telephone number to connect the telephone call.

12 Claims, 4 Drawing Sheets

400

402 — receive, by a telecommunications service provider, a telephone call request for a telephone call being placed to a toll free telephone number from a telephone within a service area of the telecommunications service provider 404 — determine, by the telecommunications service provider, that the toll free telephone number is one operated by the telecommunications service provider 406 — route the telephone call via a network of the telecommunications service provider to a telephone associated with the toll free telephone number to connect the telephone call

FIG. 4

SYSTEM AND METHOD FOR HANDLING TOLL FREE NUMBER TELEPHONE CALLS

BACKGROUND

Telecommunications service providers have traditionally operated to provide distinct services. Local telecommunications service providers receive calls from local customers and route the calls to the appropriate destinations. For example, a call being placed from a customer of a first local telecommunications service provider to another region supported by a second local telecommunications service provider is routed to a long-haul telecommunications carrier for communication between the two local telecommunications service providers. Similarly, calls to toll free telephone numbers (e.g., 800 numbers) are routed to a toll free service provider or interexchange carrier for routing to the appropriate telecommunications service providers that service the toll free telephone numbers.

Telecommunications service providers generally provide toll free numbers to its customers or prospective customers to contact sales or service customer representatives. Most larger telecommunications service providers have literally thousands of toll free telephone numbers. For example, one carrier is known to have over 3,000 official toll free numbers. On average, the cost for each call to the toll free number charged to the telecommunications service provider by an interexchange carrier is $0.0262 per minute. The average number of busy hour call attempts (BHCA) across the 3,000 toll free numbers is 2,500 BHCA, which, over the course of a year, costs in the millions of dollars paid to the interexchange carrier by the telecommunications service provider.

SUMMARY

To overcome the problem of a telecommunications service provider having to pay an interexchange carrier for calls to toll free numbers provided by the telecommunications service provider itself when customers in its own service region calls one of the telecommunications service providers' toll free numbers, the principles of the present invention provide for the telecommunications service provider to identify that a call is being placed to one of its own toll free numbers from a caller initiating the call in one of the telecommunications service provider's service areas and handling routing of the call by itself rather than sending the call to an interexchange carrier for routing. To handle the identification and routing, a local database may be established to identify a call to any of the toll free numbers of the telecommunications service providers and to route the call to the appropriate toll free telephone number in a network operated by the telecommunications service provider. It is estimated that such a configuration may save the telecommunications service provider millions of dollars a year.

One embodiment of a system for processing toll free telephone calls by a telecommunications service provider may include a local switch operated by the telecommunications service provider, and be configured to receive a telephone call request by a customer in a local service area serviced by the telecommunications service provider. A regional signaling transfer point (STP) may be in communication with the local switch, and be configured to receive information associated with the telephone call request and to transport the information. A national STP may be in communication with the regional STP, and be configured to, in response to receiving the information associated with the telephone call request from the regional STP, determine that the telephone call is being placed to a toll free telephone number. An internal service control point (SCP) may be in communication with the national STP and be configured to determine whether the telephone call is being placed to a toll free telephone number of the telecommunications service provider in response to receiving the information associated with the telephone call request. If so, then the internal SCP communicate routing instructions to the national STP; otherwise, the internal SCP may notify the national STP that the toll free telephone number is not one of the telecommunications service provider. The national STP, in response to receiving the routing instructions, may further be configured to communicate the routing instructions to the regional STP. The regional STP, in response to receiving the routing instructions, may further be configured to communicate the routing instructions to the local switch. A soft switch may be in communication with the local switch, and be configured to (i) receive the routing instructions and telephone call request, and (ii) connect the telephone call to a toll free telephone of the telecommunications service provider.

One method for processing toll free telephone calls by a telecommunications service provider may include receiving, by the telecommunications service provider, a telephone call request for a telephone call being placed to a toll free telephone number from a telephone within a service area of the telecommunications service provider. The telecommunications service provider may determine that the toll free telephone number is one operated by the telecommunications service provider. The telephone call may be routed via a network of the telecommunications service provider to a telephone associated with the toll free telephone number to connect the telephone call.

BRIEF DESCRIPTION OF THE DRAWINGS

Illustrative embodiments of the present invention are described in detail below with reference to the attached drawing figures, which are incorporated by reference herein and wherein:

FIG. 4 is a flowchart of an illustrative process for handling toll free telephone calls to toll free telephone numbers of a telecommunications service provider in accordance with the principles of the present invention.

DETAILED DESCRIPTION OF THE DRAWINGS

Figure 1:
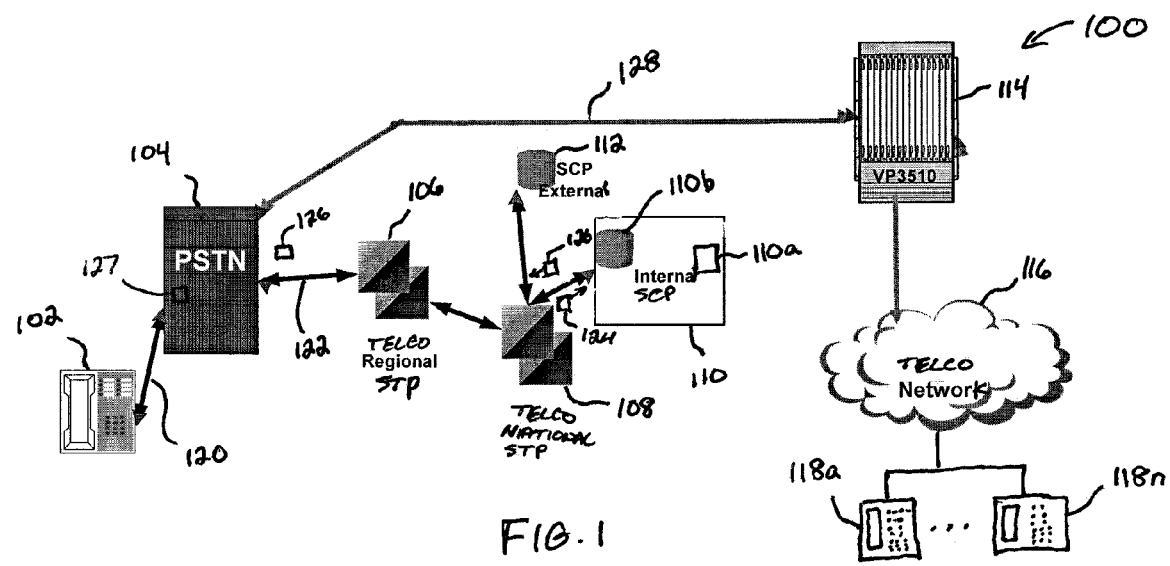
FIG. 1 is an illustration of an illustrative network environment in which a telecommunications service provider provides for telephone calls originating within a network of the telecommunications service provider to be routed to a toll free telephone number operated by the telecommunications service provider without routing the call via an interexchange carrier.

With regard to FIG. 1, a network environment 100 operated by a telecommunications service provider (telco) is shown. The network environment 100 may include a customer telephone 102 that is in communication with a switch 104 in the public switched telephone network (PSTN). The PSTN switch 104, which may be a class 5 switch, may be configured to communicate with a regional signaling transfer point (STP) 106 of the telecommunications service provider. As understood in the art, a telecommunications service provider may utilize regional STPs that are configured to support different regions and are in communication with a national STP 108. In accordance with the principles of the present invention, a service control point (SCP) 110 that is internal to the telecommunications service provider may be in communication with the national STP 108.

The internal SCP 110 may include logic 110a and a database 110b, which may be a calling party address table (ClgPA) that is configured to store toll free telephone number information, including telephone number and network address information, of toll free telephone numbers operated by the telecommunications service provider. As is conventional, the national STP 108 is in communication with an external SCP 112 operated by a third party, such as an interexchange. The external SCP is configured to operate a database that includes all toll free telephone numbers in the country.

A soft switch 114, which may be a MetaSwitch VP3510, may be a switch internal to the telecommunications service provider, and be configured to route telephone calls over a telecommunications service provider network 116 to telephones 118a-118n (collectively 118) of the telecommunications service provider. At least a portion of the telephones 118 may be configured as toll free telephone numbers to which customers or non-customers of the telecommunications service provider may call for handling new business, service requests, billing questions, or any other issues, as understood in the art.

In operation, a call 120 may be placed to the PSTN switch 104 to a toll free telephone number of the telecommunications service provider. Because the PSTN switch 104 is operated by the telecommunications service provider, the call 120 from the telephone 102 is considered to be an "on network" telephone call. The PSTN switch 104, in response to receiving the telephone call 120, communicates with the regional STP 106 at 122. The regional STP 106 may, in response, perform a query 124 to the national STP 108 using translation protocol type 254, as understood in the art, to perform a toll free telephone number query. The national STP 108, in response, may perform a global title translation (GTT) and perform a 10-digit global title translation on the potentially thousands of toll free telephone numbers of the telecommunications service provider by querying the internal SCP 110.

The internal SCP 110 utilizes the logic 110a to identify a toll free telephone number stored in the database 110b. The database 110b may include all network point codes of switches of the telecommunications service provider that support toll free call routing. The logic 110a determines whether the toll free telephone number or calling party address is found in the database 110b. If so, the logic 110a may return the dialed toll free telephone number (e.g., 800 number) and carrier identification code (CIC) with a value of 0018. Alternatively, if the toll free telephone number is not found in the database 110b, then the logic 110a returns a carrier identification code with a value of 0333. The queries and responses may be ANSI standard IN533 format, as understood in the art. It should be understood that other formats and values may be utilized in accordance with the principles of the present invention.

The response 126 from the internal SCP 110 may be communicated from the national STP 108 via the regional STP 106 to the PSTN switch 104 using standard message transfer part (MTP) routing. A pre-translator 127 operating in the PSTN switch 104 may identify the CIC having a value of 0018 and route the telephone call via trunk group 128 to the soft switch 114. The soft switch 114, in response to receiving the telephone call 120 from the PSTN switch 104, may perform a query to determine a dialed number identification service number and route the telephone call via the telecommunications network 116 to the appropriate telephone or group of telephones of the telephones 118. In one embodiment, the telephone is one of a group of telephones in a call center and the specific telephone to which the telephone call is routed may be selected by a switch at the call center based on availability of the telephone.

Figure 2:
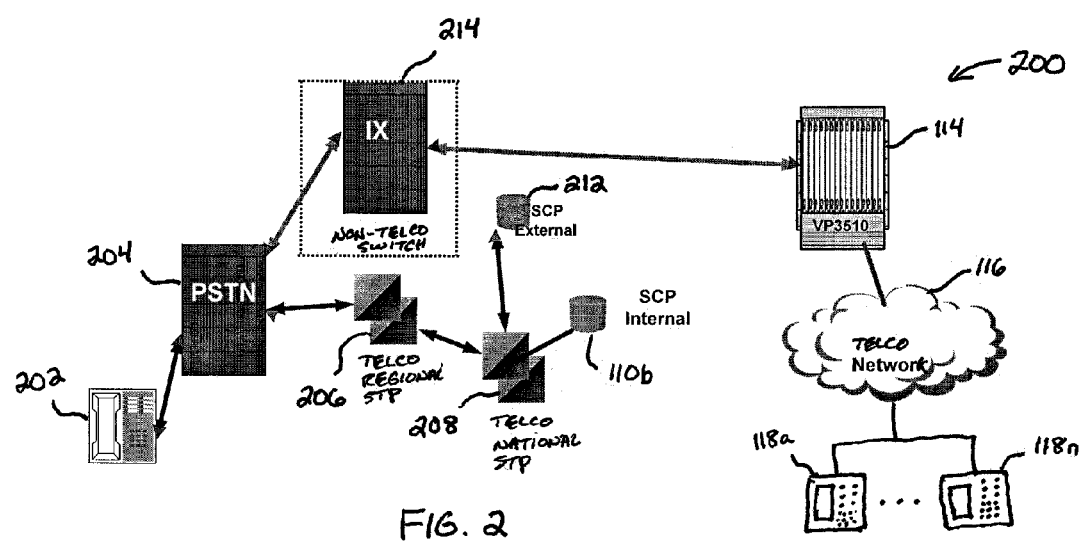
FIG. 2 is an illustration of an illustrative network environment in which a telephone call originating outside of the telecommunications service provider's network to be routed to a toll free telephone number of the telecommunications service provider via an interexchange carrier.

With regard to FIG. 2, an illustration of an illustrative network environment 200 is shown. The network environment 200 is illustrative of an originating call being placed from an off network telephone 202 as related to a telecommunications service provider's network, as described with regard to FIG. 1. The telephone 202 may be in communication with a PSTN switch 204 that is operated by the telecommunications service provider. One or more local and national STPs 206 and 208, respectively, operated by the telecommunications service provider may be utilized in determining whether a toll free telephone number that is called by a user using the telephone 202 is one operated by the telecommunications service provider by accessing the database 110b that includes toll free telephone numbers operated by the telecommunications service provider, as described with regard to FIG. 1.

If a determination is made that the toll free telephone number is one operated by the telecommunications service provider, then, as described with regard to FIG. 1, notification is provided to the PSTN switch 204 which, in response, routes the telephone call via an interexchange carrier switch 214 not operated by the telecommunications service provider for routing to soft switch 114 operated by the telecommunications service provider. The soft switch 114 routes the telephone call via the network 116 operated by the telecommunications service provider to one of the telephones 118 associated with the toll free telephone number called by the user of the telephone 202. As shown, because the telephone 202 is not serviced by the telecommunications service provider (i.e., a call made from an off network telephone), the telephone call is routed via an interexchange carrier switch 214, which, as previously described, costs the telecommunications service provider on a per minute basis for the toll free telephone call due to being routed via the interexchange carrier.

Figure 3:
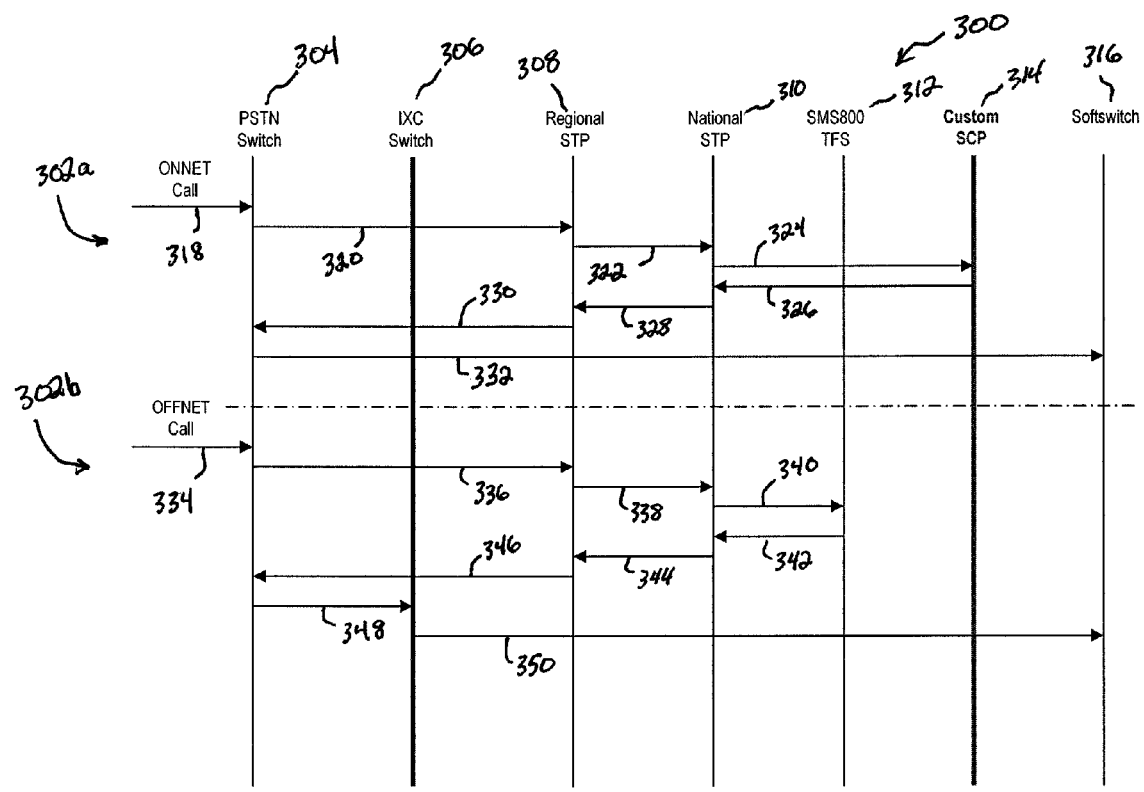
FIG. 3 is a flow diagram of (i) an illustrative process for handling "on network" calls to toll free telephone numbers of a telecommunications service provider, and (ii) "off network" telephone calls to a toll free telephone number of the telecommunications service provider.

With regard to FIG. 3, two illustrative call flow diagrams 300 are shown, where a first call flow diagram 302a illustrates an on-network call to a toll free telephone number of a telecommunications service provider and illustrative call flow process 302b illustrates an off-network call to a toll free telephone number of a telecommunications service provider. The call flow process 300 may interact with a PSTN switch 304, interexchange carrier switch 306, regional STP 308, national STP 310, external toll free service telephone number database or SCP 312, internal toll free service telephone database or SCP 314, and soft switch 316.

In operation, an on-network telephone call 318 from a telephone to a toll free telephone number is received at the PSTN switch 304. At step 320, the PSTN switch 304 communicates the regional STP 308 of the telecommunications service provider. At step 322, a request from the regional STP 308 is communicated to the national STP 310 to determine whether the toll free telephone number is operated by the telecommunications service provider. At step 324, the national STP 310 queries the internal SCP 314 to determine whether the toll free telephone number is operated by the telecommunications service provider. At step 326, a response from the internal SCP 314 is communicated back to the national STP 310, which, in turn, communicates the information to the regional STP 308 at step 328. At step 330, the regional STP 308 communicates the information received from the internal SCP 314 to the PSTN switch 304. If the toll free telephone number is determined to be operated by the telecommunications service provider, as identified by the internal SCP 314, then the PSTN switch 304 connects the telephone call to the soft switch 316 which, if the toll free telephone number is operated by the telecommunications service provider, connects the telephone call to the toll free telephone number operated by the telecommunications service provider via a network operated by the telecommunications service provider. Alternatively, if the toll free telephone number is not operated by the telecommunications service provider, then the PSTN switch 304 connects the telephone call via a network (not shown) not operated by the telecommunications service provider network via the interexchange carrier switch 306.

Process 302b shows an off-network telephone call 334 being communicated via the PSTN switch 304. The off-network telephone call 334 is received from a communications network not serviced by the telecommunications service provider. At step 336, the PSTN switch 304 requests handling instructions from the regional STP 308. At step 338, the regional STP 308 communicates with the national STP 310, which, in turn, queries the external database 312 containing toll free telephone numbers both operated by the telecommunications service provider and not operated by the telecommunications service provider. The external database 312 may respond to the query with information associated with the toll free telephone number. In one embodiment, the information may include a network address of the toll free telephone number. The national STP 310 may receive the information and communicate the information to the regional STP at step 344. At step 346, the regional STP 308 may communicate the information associated with the toll free telephone number to the PSTN switch 304. The PSTN switch 304 may connect the off-network telephone call 334 via the interexchange carrier switch 306 to the soft switch 316, which, in turn, connects the telephone call with the appropriate toll free telephone number.

With regard to FIG. 4, a flow chart of an illustrative process 400 for processing toll free telephone calls by a telecommunications service provider is provided. At step 402, the telecommunications service provider may receive a telephone call request for a telephone call being placed to a toll free telephone number from a telephone within a service area of the telecommunications service provider. The telecommunications service provider may determine that the toll free telephone number is one operated by the telecommunications service provider at step 404. The determination may be made internally. In one embodiment, the determination may be made utilizing an SCP internal to the telecommunications service provider. The internal SCP may include a database that includes toll free telephone numbers operated by the telecommunications service provider. At step 406, the telephone call may be routed via a network of the telecommunications service provider to a telephone associated with the toll free telephone number to connect the telephone call. In one embodiment, the telephone call may be routed via a soft switch operated by the telecommunications service provider.

A determination that the toll free telephone number is not one operated by the telecommunications service provider may be made. In determining that the telecommunications service provider does not operate the toll free telephone number, routing information for the telephone call may be requested from a database externally located from the telecommunications service provider. The telephone call may be routed via a network not of the telecommunications service provider.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for processing toll free telephone calls by a telecommunications service provider, said system comprising:
   a local switch operated by the telecommunications service provider, and configured to receive a telephone call request by a customer in a local service area serviced by the telecommunications service provider;
   a regional signaling transfer point (STP) in communication with said local switch, and configured to receive information associated with the telephone call request and transport the information;
   a national STP in communication with said regional STP, and configured to, in response to receiving the information associated with the telephone call request from said regional STP, determine that the telephone call is being placed to a toll free telephone number;
   an internal service control point (SCP) in communication with said national STP and configured to:
      in response to receiving the information associated with the telephone call request, determine whether the telephone call is being placed to a toll free telephone number of the telecommunications service provider; and
      if so, then communicate routing instructions to said national STP;
      otherwise, notify said national STP that the toll free telephone number is not one of the telecommunications service provider;
   said national STP, in response to receiving the routing instructions, being further configured to communicate the routing instructions to said regional STP;
   said regional STP, in response to receiving the routing instructions, being further configured to communicate the routing instructions to said to local switch; and
   a soft switch in communication with said local switch, and configured to:
      receive the routing instructions and telephone call request; and
      connect the telephone call to a toll free telephone of the telecommunications service provider.

2. The system according to claim 1, wherein said national STP is further configured to:
   in response to receiving the notification from said internal SCP that the toll free telephone number is not one of the telecommunications service provider, query an external SCP with the information associated with the telephone call request; and
   communicate routing information received from the external SCP to said regional STP to cause the telephone call to be routed to the requested toll free number via an interexchange carrier switch.

3. The system according to claim 2, wherein if said national STP determines from the information associated with the telephone call request that the call was received from a local switch not operated by the telecommunications service provider, being further configured to query the external SCP with the information associated with the telephone call request.

4. The system according to claim 1, further comprising a database located in communication with said internal SCP, said database including a list of each toll free telephone number of the telecommunications service provider and routing information associated with each toll free telephone number.

5. The system according to claim 1, wherein said internal SCP operates logic that, in response to determining that the telephone call is placed to a toll free telephone number of the telecommunications service provider, generate a carrier identification code having a value representative of the telecommunications service provider operating the toll free telephone number.

6. The system according to claim 5, wherein the carrier identification code is a value of 0018.

7. The system according to claim 5, wherein said local switch is further configured to operate a pre-translator configured to determine the value of the carrier identification code and, based on the value of the carrier identification code, route the telephone call to said soft switch or to a switch operated by an interexchange carrier.

8. A method for processing toll free telephone calls by a telecommunications service provider, said method comprising:
   receiving, at a local switch operated by the telecommunications service provider, a telephone call request by a customer in a local service area serviced by the telecommunications service provider;
   receiving, at a regional signaling transfer point (STP) in communication with the local switch, information associated with the telephone call request;
   transporting, by the regional STP, the information associated with the telephone call request to a national STP;
   receiving, at the national STP in communication with the regional STP, the information associated with the telephone call request;
   determining, at the national STP, that the telephone call is being placed to a toll free telephone number;
   determining, at an internal service control point (SCP) in communication with the national STP and in response to receiving the information associated with the telephone call request, whether the telephone call is being placed to a toll free telephone number of the telecommunications service provider; and
   if so, communicating, by the internal SCP, routing instructions to the national STP;
   otherwise, notifying, by the internal SCP, the national STP that the toll free telephone number is not one of the telecommunications service provider;
   communicating, by the national STP in response to receiving the routing instructions, the routing instructions to the regional STP;
   communicating, by the regional STP in response to receiving the routing instructions, the routing instructions to the local STP;
   receiving, at a soft switch in communication with the local switch, the routing instructions and the telephone call request; and
   connecting, at the soft switch, the telephone call to a toll free telephone of the telecommunication service provider.

9. The method according to claim 8, further comprising:
   determining that the toll free telephone number is not one operated by the telecommunications service provider;
   requesting routing information for the telephone call from a database externally located from the telecommunications service provider; and
   routing the telephone call via a network not of the telecommunications service provider.

10. The method according to claim 8, wherein determining that the toll free telephone number is one of the telecommunications service provider is performed internally by the telecommunications service provider.

11. The method according to claim 8, further comprising:
   assigning a first value to a carrier identification code if the toll free telephone number is one of the telecommunications service provider; and
   assigning a second value to the carrier identification code if the toll free telephone number is not one of the telecommunications service provider.

12. The method according to claim 8, wherein routing the telephone call includes routing the telephone call via a soft switch in the network of the telecommunications service provider.

* * * * *